3,095,288
FRACTIONATION PROCESS INVOLVING MOLECULAR SIEVES

Eugene E. Sensel, Beacon, N.Y., assignor to Texaco Inc., New York, N.Y., a corporation of Delaware
No Drawing. Filed Dec. 7, 1959, Ser. No. 857,567
7 Claims. (Cl. 55—62)

This invention relates to a method of separating a mixture of organic compounds. More particularly, this invention relates to a fractionation process employing a selective adsorbent and involving adsorption and desorption.

In accordance with one embodiment this invention is directed to a fractionation process involving the separation of straight chain hydrocarbons from petroleum streams containing the same admixed with non-straight chain hydrocarbons. In accordance with another embodiment this invention is directed to an improved method of carrying out the desorption of adsorbed straight chain hydrocarbons from alumino-silicate molecular sieve type adsorbents.

It is known to employ selective adsorbents for the fractionation of mixtures to separate therefrom by selective adsorption one component or a particular type of component. Various selective adsorbents are known. These selective adsorbents include silica gel, clays, alumina, activated charcoal, specially treated coke, naturally occurring zeolites and synthetically prepared zeolites of the molecular sieve type. Alumino-silicate molecular sieve type adsorbents are particularly useful in a selective adsorption process in accordance with the practice of this invention.

Molecular sieve type adsorbents are synthetically prepared zeolitic materials made up of porous crystals the pores of which are of a uniform diameter and of molecular dimension. Alumino-silicate molecular sieve type adsorbents having a pore size or pore diameter or about 4 Angstrom units and 5 Angstrom units and larger are known and are employed on a commercial scale.

Molecular sieve type adsorbents having a pore diameter of about 5 Angstrom units are particularly useful since adsorbents of this type, i.e. having a pore diameter of about 5 Angstrom units, permit the entry thereinto and the selective adsorption of straight chain hydrocarbons and other organic compounds having a straight chain molecular configuration, such as the n-paraffins, the n-olefins, the normal primary alcohols and the like to the substantial exclusion of non-straight chain hydrocarbons and non-straight chain organic compounds such as the isoparaffins, the aromatic hydrocarbons, the alicyclic or naphthenic hydrocarbons and the secondary and tertiary alcohols such as tertiary butyl alcohol.

In the employment of alumino-silicate molecular sieve type selective adsorbents for the separation of straight chain compounds from non-straight chain compounds difficulty has been observed in the desorption of the adsorbed relatively long chain, relatively high molecular weight straight chain hydrocarbons from the adsorbent. More particularly, it has been observed that the higher molecular weight straight chain compounds, such as the straight chain hydrocarbons having a carbon atom content of at least about 8 carbon atoms per molecule, especially those straight chain hydrocarbons containing at least about 12 carbon atoms per molecule, are desorbed from the adsorbent only with difficulty. In the instance of the relatively high molecular weight straight chain hydrocarbons, $C_{12}$ and higher, the temperatures sometimes employed to effect a satisfactorily rapid desorption of these hydrocarbons from the molecular sieve type adsorbents approach the cracking temperature of these hydrocarbons with the result that, upon desorption, chemical modification or conversion (cracking) of these straight chain hydrocarbons occurs. Moreover, the temperatures employed to effect a fairly rapid and satisfactory desorption of these relatively high molecular weight straight chain compounds from the adsorbent approach the temperature at which damage to the physical or crystalline structure of the molecular sieve adsorbent might occur, particularly if the adsorbent is maintained at these high desorption temperatures for a prolonged period of time.

Accordingly it is an object of this invention to provide an improved selective adsorption process employing alumino-silicate molecular sieve type adsorbents for the separation of straight chain compounds from non-straight chain compounds.

Another object of this invention is to provide an improved selective adsorption process, involving separate adsorption and desorption operations, wherein the desorption of relatively high molecular weight straight chain compounds, such as straight chain hydrocarbons, from molecular sieve type adsorbents is improved.

Another object of this invention is to provide a process for the desorption of higher molecular weight straight chain hydrocarbons from alumino-silicate molecular sieve type adsorbents at relatively low temperatures.

Still another object of this invention is to provide a method of increasing the useful life of an alumino-silicate molecular sieve type adsorbent when employed in a fractionation operation, involving separate adsorption and desorption operations, for the separation of relatively high molecular weight straight chain hydrocarbons, such as straight chain hydrocarbons containing at least about 8 carbon atoms per molecule, from substantially co-boiling non-straight chain hydrocarbons.

How these objects are achieved will become apparent in the light of the accompanying disclosure. In at least one embodiment of the practice of this invention at least one of the foregoing objects will be achieved.

In accordance with this invention less readily desorbable adsorbed components are expeditiously desorbed from selective adsorbents containing these components adsorbed therein by carrying out the desorption operation such that concomitantly with the desorption of these less readily desorbable adsorbed components there are also desorbed from said adsorbent more readily desorbable adsorbed components. More particularly, in accordance with the practice of this invention relatively high molecular weight less readily desorbable straight chain hydrocarbons, such as straight chain hydrocarbons containing 8 or more carbon atoms per molecule, are relatively readily desorbed from a selective adsorbent containing these straight chain hydrocarbons adsorbed therein by providing within said adsorbent, adsorbed with said relatively high molecular weight straight chain hydrocarbons a relatively low molecular weight, more readily desorbable straight chain hydrocarbon such as a straight chain hydrocarbon containing less than 8 carbon atoms per molecule, e.g. n-butane.

In the practice of this invention wherein both relatively high molecular weight and low molecular weight straight chain hydrocarbons are contained adsorbed within a selective adsorbent for these materials during the desorption operation, since the relatively low molecular weight straight chain hydrocarbons are more readily desorbable from the adsorbent, these low molecular weight straight chain hydrocarbons aid in the desorption of the relatively high molecular weight straight chain hydrocarbons. These low molecular weight hydrocarbons aid in the desorption of the relatively high molecular weight hydrocarbons by imparting part of their energy, e.g. kinetic energy by molecular collision, to the high molecular weight straight chain hydrocarbons contained adsorbed within the pores of the adsorbent. As the low molecular weight hydrocarbons tend to be expelled and desorbed from the adsorbent they impart at least a portion of their kinetic energy by molecular collision with the high molecular weight straight chain hydrocarbons, thereby creating within the pores of the adsorbent an internal pressure tending to and effective to expel or desorb or to aid in the expulsion or desorption of the relatively high molecular weight straight chain hydrocarbons also adsorbed within the adsorbent.

The more readily desorbable, relatively low molecular weight materials contained within the selective adsorbent employed in the practice of this invention may be provided therein so as to be effective during the desorption operation for the desorption of the relatively high molecular weight hydrocarbons in any suitable manner. For example these more readily desorable low molecular weight materials may be originally admixed with the feed mixture containing the less readily desorbable, higher molecular weight components so that during the actual fractionation operation wherein by selective adsorption the fed mixture to be separated is fractionated, both the low molecular weight, more readily desorbable components and the less readily desorbable, relatively high molecular weight components are substantially simultaneously adsorbed by the adsorbent with the result that after the completion of the adsorption operation the adsorbent is substantially saturated with both the more readily desorbable, low molecular weight component and the less readily desorbable high molecular weight component. Following the above-indicated adsorption operation the adsorbent is then subjected to desorption in accordance with the practice of this invention to effect the desorption of both the high and low molecular weight components therefrom.

In accordance with another method of carrying out the practice of this invention the adsorbent containing the less readily desorbable, relatively high molecular weight material adsorbed therein is contacted under desorption conditions of temperature and pressure with more readily desorbable, relatively low molecular weight material to desorb the adsorbed relatively high molecular weight material from the adsorbent. Following this desorption operation the adsorbent is recovered substantially saturated with the aforesaid more readily desorbable, relatively low molecular weight material, preferably in an amount of at least about 3-4% by wt. based on adsorbent, depending upon the low molecular weight material employed and the desorption conditions, and substantially completely desorbed of the less readily desorbable, relatively high molecular weight material. The resulting adsorbent is then employed to effect the separation by adsorption of high molecular weight, less readily desorable component from additional feed mixture.

Various other adsorption and desorption operations carried out in combination can be employed in the practice of this invention to assure the presence in the adsorbent during the desorption operation of both the less readily desorbable, high molecular weight component and the more readily desorbable relatively low molecular weight component.

In the practice of this invention any suitable more readily desorbable, relatively low molecular weight material may be employed, provided it is adsorbable within the adsorbent employed along with the relatively less readily desorbable, relatively high molecular weight material. Suitable more readily desorbable, relatively low molecular weight material which may be employed in the practice of this invention include the relatively low molecular weight straight chain hydrocarbons such as n-heptane, n-hexane, n-pentane, n-butane, as well as propane and ethane and the various other low molecular weight hydrocarbons, particularly those hydrocarbons which have a molecular configuration such that they are adsorbed within an alumino-silicate molecular sieve type adsorbent having a pore size diameter of about 5 Angstrom units. Other more readily desorbable materials which may be employed in the practice of this invention include carbon dioxide, ammonia, sulfur dioxide, hydrogen, nitrogen, combustion gases and the like. Particularly useful in the practice of this invention are n-pentane, n-butane, propane and mixtures thereof.

The practice of this invention is applicable to any suitable adsorbent, particularly an alumino-silicate molecular sieve type adsorbent which selectively adsorbs straight chain organic compounds, such as straight chain hydrocarbons, to the substantial exclusion of non-straight chain organic compounds, such as non-straight chain hydrocarbons, is suitable. By straight chain organic compounds is meant any acyclic, straight chain organic compound which does not evidence side chain branching. Examples of straight chain organic compounds are the normal paraffins, e.g. n-butane, n-pentane, n-hexane, the n-butylenes, the n-pentenes, the n-hexenes, butadiene, the straight chain acetylenic compounds and their higher and lower molecular weight homologs. By non-straight chain organic compounds is meant aromatic, alicyclic or naphthenic or acyclic or aliphatic compounds which possess side chain branching. Examples of non-straight chain organic compounds are benzene, toluene, isopentane, isohexane, isobutane, cyclohexane, methyl cyclohexane, cyclopentadiene and their respective higher and lower molecular weight homologs.

In the practice of this invention it is preferred to employ as the selective adsorbent material for straight chain hydrocarbons certain natural or synthetic zeolites or alumino-silicates such as calcium alumino-silicates which exhibit the properties of a molecular sieve, that is, matter made up of porous crystals wherein the pores of the crystals are of molecular dimension and are of uniform size. A particularly suitable solid adsorbent for straight chain organic compounds is a sodium calcium alumino-silicate. Molecular sieve adsorbents of this type have a pore size or diameter of about 5 Angstrom units, a pore size sufficiently large to admit straight chain hydrocarbons, such as the n-paraffins, to the substantial exclusion of the non-straight chain naphthenic, aromatic and isoparaffinic and isoolefinic hydrocarbons.

Other suitable solid selective adsorbents include the synthetic and natural zeolites which, when dehydrated, may be described as crystalline zeolites having a rigid three dimensional anionic network and having interstitial dimensions sufficiently large to adsorb straight chain hydrocarbons but sufficiently small to exclude non-straight chain hydrocarbons. The naturally occurring zeolite, chabazite, exhibits such desirable properties. Another suitable naturally occurring zeolite is analcite which, when dehydrated, and when all or part of the sodium is replaced by an alkaline earth metal such as calcium yields a material which may be represented by the formula $(Ca,Na_2) Al_2Si_4O_{12}.2H_2O$ and which, after suitable conditioning, will adsorb straight chain hydrocarbons to the substantial exclusion of non-straight chain hydrocarbons.

In the adsorption operation wherein the less readily desorbable, relatively high molecular weight hydrocarbons are adsorbed by the adsorbent any suitable adsorption pressure may be employed. Generally an adsorption pressure in the range 0-2000 p.s.i.g. is employed. Similarly, during the desorption operation wherein the adsorbent containing both less readily and more readily desorbable components adsorbed therein is treated for the substantially simultaneous desorption of these materials, a pressure, substantially the same as the pressure employed during the adsorption operation may be utilized although a desorption pressure greater than or less than the adsorption pressure may be employed. Usually the pressure employed during the desorption operation is in the range 0.1-2000 p.s.i.a.

Any suitable temperature may be employed during the adsorption operation, usually a temperature in the range 50–750° F. Also, during the desorption operation any suitable temperature may be employed, such as a temperature in the range 50–800° F. The adsorption and desorption operations may be carried out isothermally if desired. It usually is desirable, however, to carry out the desorption operation at a temperature greater than the adsorption temperature, such as a temperature in the range 50–250 degrees Fahrenheit greater than the adsorption temperature.

Both the adsorption and desorption operations may be carried out in the liquid phase, i.e. the particular mixture undergoing fractionation by selective adsorption may be present in the liquid phase and recovered, upon desorption, in the liquid phase. Also, if desired, the adsorption and desorption operations may be carried out in the gaseous or vapor phase or if desired the adsorption operation may be carried out in the liquid or gas phase and the desorption operation being carried out in the gas and liquid phase, respectively. In connection with the adsorption and/or desorption operations the temperature and pressure employed are adjusted to yield the desired phase condition, liquid or gas, during these operations.

It is preferred in the practice of this invention while carrying out the desorption operation to employ as the desorbing medium the same, more readily desorbable, relatively low molecular weight material or straight chain hydrocarbon which is contained adsorbed within the adsorbent along with the less readily desorbable, relatively high molecular weight material or hydrocarbon. When a fractionation operation is carried out in this manner a secondary separation or fractionation step for the separate recovery of the more readily desorbable component and the desorbing medium is obviated. In accordance with this aspect of the invention, in the fractionation of a feed mixture containing $C_6$–$C_{12}$ straight chain hydrocarbons there is admixed with the feed mixture n-butane in a substantial amount, e.g. in an amount in the range 10–50% by vol. based in said mixture, so that during the adsorption operation both n-butane and the $C_6$–$C_{12}$ straight chain hydrocarbons are simultaneously adsorbed by the adsorbent. During the subsequent desorption operation both n-butane and the $C_6$–$C_{12}$ straight chain hydrocarbons are desorbed from the adsorbent.

If desired, as indicated hereinabove, the feed mixture containing $C_6$–$C_{12}$ straight chain hydrocarbons is contacted with the selective adsorbent to effect the removal by selective adsorption of the $C_6$–$C_{12}$ straight chain hydrocarbons therefrom. Thereupon the adsorbent, now substantially saturated with $C_6$–$C_{12}$ straight chain hydrocarbons, is contacted with a stream of a low molecular weight straight chain hydrocarbon, such as a $C_3$–$C_6$ hydrocarbon, e.g. n-butane, under desorption conditions of temperature and pressure effective to desorb the adsorbed $C_6$–$C_{12}$ straight chain hydrocarbons therefrom and to leave the adsorbent substantially saturated with the lower molecular weight hydrocarbon. Following this desorption operation the adsorbent, now substantially saturated with the lower molecular weight hydrocarbon, contacts additional feed mixture containing $C_6$–$C_{12}$ straight chain hydrocarbons to effect the removal of additional straight chain hydrocarbons therefrom.

The following are illustrative of the practice of this invention. A heavy naphtha stream having a boiling range in the range 200–450° F. and containing straight chain hydrocarbons in the molecular weight range $C_8$–$C_{12}$ is contacted in the liquid phase with an alumino-silicate molecular sieve type selective adsorbent effective to adsorb straight chain hydrocarbons to the substantial exclusion of non-straight chain hydrocarbons. The adsorption operation is carried out under conditions such that the heavy naphtha is maintained in the liquid phase, such as at a temperature in the range 50–300° F. and a pressure in the range 0–500 p.s.i.g. Following the adsorption operation the adsorbent, now substantially saturated with straight chain hydrocarbons in the molecular weight range $C_8$–$C_{12}$ hydrocarbons is contacted with a liquid $C_4$ stream containing n-butane under desorption conditions of temperature and pressure to desorb the adsorbed straight chain hydrocarbons. Desirably the desorption operation is carried out under temperature and pressure conditions substantially the same as those prevailing during the adsorption operation but at the same time effective so that the $C_4$ hydrocarbon stream is maintained in the liquid phase during the desorption operation. After continued contact of the adsorbent with the liquid $C_4$ hydrocarbon stream the adsorbed $C_8$–$C_{12}$ straight chain hydrocarbons are desorbed therefrom and separated by fractionation from the $C_4$ hydrocarbons in the resulting desorption effluent. The adsorbent, following the desorption operation, is now substantially saturated with n-butane hydrocarbons and is returned to contact additional heavy naphtha for the removal of $C_8$–$C_{12}$ straight chain hydrocarbons therefrom. Following this second contact or adsorption operation there is recovered therefrom the adsorbent now substantially saturated with both $C_8$–$C_{12}$ straight chain hydrocarbons and n-butane. Thereupon the adsorbent is again subjected to desorption conditions of temperature and pressure by contact with an additional liquid $C_4$ hydrocarbon stream containing n-butane so as to effect the simultaneous desorption of the previously adsorbed $C_8$–$C_{12}$ straight chain hydrocarbons and n-butane therefrom, leaving behind the adsorbent now substantially saturated with n-butane. During this subsequent desorption operation the n-butane already adsorbed within the adsorbent along with the $C_8$–$C_{12}$ straight chain hydrocarbons aids and expedites in the removal of these $C_8$–$C_{12}$ hydrocarbons from the adsorbent.

Although the aforesaid operations are described herein as having occurred in the liquid phase during both the adsorption and desorption operations, as indicated hereinabove, if desired these operations with substantially the same results can be carried out in the gaseous or vapor phase.

In accordance with yet another embodiment of the practice of this invention a petroleum stream containing relatively high boiling, high molecular weight straight chain hydrocarbons, such as a petroleum fraction boiling in the range 300–800° F., is admixed with a minor amount of a relatively low boiling petroleum fraction containing straight chain hydrocarbons having not more than about 4 carbon atoms per molecule. The resulting admixture of relatively high boiling petroleum fraction containing straight chain hydrocarbons and relatively low boiling straight chain hydrocarbons, such as n-butane, is vaporized and contacted at a suitable temperature and pressure with an alumino-silicate molecular sieve adsorbent effective to adsorb straight chain hydrocarbons to the substantial exclusion of non-straight chain hydrocarbons. As a result of this contacting operation both the relatively low molecular weight (n-butane) and the relatively high molecular weight straight chain hydrocarbons are simultaneously adsorbed by the adsorbent with the result that the adsorbent becomes substantially saturated with a mixture of these straight chain hydrocarbons.

Following the aforesaid adsorption operation the adsorbent is contacted with a gaseous desorbing medium such as methane, ethane, hydrogen, combustion gases, nitrogen and the like, i.e. materials having molecular dimensions sufficiently small to permit their entry into a molecular sieve type adsorbent having a pore size of about 5 Angstrom units.

Desirably the desorbing medium is n-butane or the same low boiling straight chain hydrocarbon or mixture of low boiling straight chain hydrocarbons admixed with the high boiling petroleum fraction just prior to the desorption operation so that upon completion of the desorption operation a secondary fractionation for the separation of the desorbing medium and the extraneously added low boiling straight chain hydrocarbon is not required. By operating in this manner the adsorbent is recovered substantially free of adsorbed straight chain hydrocarbons (in the instance where the desorbing medium is material such as methane and hydrogen) or the adsorbent is recovered substantially saturated with a low boiling straight chain hydrocarbon such as n-butane if this material is employed as the desorbing medium.

Another feature of the practice of this invention, particularly when the adsorption and desorption operations are carried out in the gaseous phase, it is desirable to carry out the desorption operation at a temperature above the critical temperature of the extraneously added readily desorbable, relatively low molecular weight straight chain hydrocarbon. Accordingly in the practice of this embodiment of the invention when n-butane is the extraneously added relatively low molecular weight straight chain hydrocarbon and/or is employed as the desorbing medium, the desorption operation is carried out at a temperature above the critical temperature of n-butane.

In accordance with still another embodiment of the practice of this invention a gaseous hydrocarbon stream comprising a heavy $C_8$–$C_{12}$ naphtha and containing a substantial amount of relatively low molecular weight straight chain hydrocarbons, such as hydrocarbons in the molecular weight range $C_3$–$C_5$, e.g. n-butane in an amount in the range 10–15% by vol. based on the total feed, is contacted at an elevated temperature, such as a temperature in the range 600–650° F., with an alumino-silicate molecular sieve adsorbent which selectively adsorbs straight chain hydrocarbons to the substantial exclusion of non-straight chain hydrocarbons. The contacting operation for the removal of the straight chain hydrocarbons contained in the feed admixture is carried out at a relatively elevated pressure, such as a pressure in the range 10–200 p.s.i.g., more or less, yet sufficiently low such that the feed mixture undergoing treatment is maintained in the gaseous phase during the contacting operation.

As a result of the contacting operation the selective adsorbent, under the contacting conditions of temperature and pressure becomes substantially saturated with straight chain hydrocarbons, both the aforementioned relatively low molecular weight straight chain hydrocarbons (n-butane) and the straight chain hydrocarbons contained in the $C_8$–$C_{12}$ naphtha. The amount of relatively low molecular weight straight chain hydrocarbons contained in the adsorbent as a result of the contacting operations is usually in the range 0.5–5.0% by wt. based on the adsorbent depending upon the contacting conditions of temperature and pressure. Likewise the amount of relatively high molecular weight straight chain hydrocarbons contained in the $C_8$–$C_{12}$ naphtha feed adsorbed by the adsorbent following the adsorption operation is usually in the range 1–10% by wt. based on the $C_8$–$C_{12}$ naphtha feed.

Following the above-described adsorption operation the adsorbent, now substantially saturated with straight chain hydrocarbons, is subjected to a substantially reduced pressure, such as a pressure in the range 0.1–20 p.s.i.a. and at substantially the same temperature as employed during the contacting or adsorption operation. As a result of subjecting the adsorbent to the reduced pressure the relatively low molecular weight straight chain hydrocarbon adsorbed therein tends to be desorbed from the adsorbent and at the same time tends to desorb from the adsorbent the already adsorbed relatively high molecular weight straight chain hydrocarbons contained in the $C_8$–$C_{12}$ feed. If desired to aid in the desorption of these relatively high molecular weight straight chain hydrocarbons the adsorbent, during the desorption operation carried out under a relatively low pressure as compared with the adsorption operation, is desirably contacted with additional relatively low molecular weight straight chain hydrocarbons such as a $C_3$–$C_4$ fraction. The desorption operation is carried out for a period of time sufficient to desorb substantially all of the relatively high molecular weight straight chain hydrocarbons in the $C_8$–$C_{12}$ molecular weight range from the adsorbent leaving behind, following the desorption operation, the adsorbent substantially saturated with the relatively low molecular weight straight chain hydrocarbons ($C_3$–$C_4$ hydrocarbons) under the temperature and pressure conditions employed during the desorption operation.

As will be apparent to those skilled in the art various modifications, changes and substitutions may be employed in the practice of this invention without departing from the spirit or scope thereof.

I claim:

1. A method of fractionating a mixture containing at least one first adsorbable hydrocarbon component and at least one non-adsorbable hydrocarbon component, said first adsorbable component being adsorbable on a molecular sieve type adsorbent, which comprises contacting said mixture with a molecular sieve type adsorbent having a pore size sufficiently large to adsorb said first adsorbable component to the exclusion of said non-adsorbable component, said molecular sieve adsorbent having been pretreated by contact with an amount of at least one second adsorbable hydrocarbon component, said second adsorbable component also being capable of being adsorbed by said adsorbent to the substantial exclusion of said non-adsorbable component, to only partially saturate said molecular sieve adsorbent, carrying out the contacting operation of the thus-pretreated molecular sieve adsorbent with said mixture for a period of time sufficient to saturate said molecular sieve adsorbent with said first adsorbable component and said second adsorbable component, said second adsorbable component having a molecular weight substantially lower than said first adsorbable component and subsequently desorbing both the adsorbed said first and second adsorbable components from said molecular sieve adsorbent whereby said adsorbed second adsorbable component upon desorption from said molecular sieve adsorbent improves the desorption of said adsorbed first adsorbable component from said molecular sieve adsorbent, the desorption step being carried out by contacting the saturated molecular sieve adsorbent with a desorbing medium having the same composition as said second adsorbable component.

2. A method of fractionating a petroleum mixture consisting essentially of straight chain hydrocarbons and non-straight chain hydrocarbons having at least 5 carbon atoms per molecule, which comprises incorporating in said petroleum mixture a straight chain hydrocarbon containing less than 5 carbon atoms per molecule, contacting the resulting mixture with an alumino-silicate molecular sieve type adsorbent which selectively adsorbs straight chain hydrocarbons to the substantial exclusion of non-straight chain hydrocarbons under conditions to effect the adsorption of said straight chain hydrocarbons from said admixture whereby said molecular sieve adsorbent becomes substantially saturated with straight chain hydrocarbons containing at least 5 carbon atoms per molecule and less than 5 carbon atoms per molecule and desorbing said adsorbed straight chain hydrocarbons from said adsorbent, by contacting said adsorbent with said straight chain hydrocarbon containing less than 5 carbon atoms per molecule.

3. A method in accordance with claim 2 wherein said straight chain hydrocarbon containing less than 5 carbon atoms per molecule is n-butane.

4. A method in accordance with claim 2 wherein said straight chain hydrocarbon containing less than 5 carbon atoms per molecule is n-propane.

5. A petroleum treating method wherein a straight chain hydrocarbon is removed from a petroleum stream by contact with an alumino-silicate molecular sieve type adsorbent which selectively adsorbs straight chain hydrocarbons to the substantial exclusion of non-straight chain hydrocarbons which comprises contacting a petroleum stream containing at least one straight chain hydrocarbon having at least about 8 carbon atoms per molecule and a non-straight chain hydrocarbon having at least about 8 carbon atoms per molecule with said adsorbent to selectively adsorb said straight chain hydrocarbon therefrom, desorbing the adsorbed straight chain hydrocarbon from said adsorbent by contact with a straight chain hydrocarbon having a number of carbon atoms per molecule which is smaller than the number of carbon atoms per molecule in said first-mentioned straight chain hydrocarbon, carrying out the aforesaid desorption operation to an extent such that said first-mentioned straight chain hydrocarbon is substantially completely desorbed from said selective adsorbent to yield a selective adsorbent substantially saturated with said second-mentioned straight chain hydrocarbon and contacting additional petroleum stream containing said first-mentioned straight chain hydrocarbon with said selective adsorbent to selectively adsorb said straight chain hydrocarbons therefrom, and desorbing said adsorbed straight chain hydrocarbons from said adsorbent by contacting the adsorbent with a straight chain hydrocarbon having a smaller number of carbon atoms per molecule than the carbon atoms in said first-mentioned straight chain hydrocarbon.

6. A method in accordance with claim 5 wherein said first-mentioned hydrocarbon is a straight chain hydrocarbon in the molecular weight range $C_8$ to $C_{12}$ and wherein said second straight chain hydrocarbon is in the molecular weight range $C_2$ to $C_7$.

7. Method in accordance with claim 6 wherein said second straight chain hydrocarbon is in the molecular weight range $C_3$ to $C_5$.

References Cited in the file of this patent
UNITED STATES PATENTS

| | | |
|---|---|---|
| 2,818,455 | Ballard | Dec. 31, 1957 |
| 2,858,901 | Fort | Nov. 8, 1958 |
| 2,881,862 | Fleck et al. | Apr. 14, 1959 |
| 2,894,998 | Hess et al. | July 14, 1959 |
| 2,921,970 | Gilmore | Jan. 19, 1960 |
| 2,975,222 | Findlay | Mar. 14, 1961 |